INVENTOR
Fred Krahulec

Aug. 6, 1957 — F. KRAHULEC — 2,801,896
MECHANICAL TIME MARKER
Filed July 21, 1951 — 4 Sheets-Sheet 3

INVENTOR
Fred Krahulec

Aug. 6, 1957  F. KRAHULEC  2,801,896
MECHANICAL TIME MARKER

Filed July 21, 1951  4 Sheets-Sheet 4

INVENTOR.
Fred Krahulec
BY
Mason, Kolehmainen, Rathburn & Wyss
Attorneys

United States Patent Office 2,801,896
Patented Aug. 6, 1957

2,801,896

MECHANICAL TIME MARKER

Fred Krahulec, Skokie, Ill., assignor to A. C. Nielsen Company, Chicago, Ill., a corporation of Illinois Application July 21, 1951, Serial No. 237,913

13 Claims. (Cl. 346—20)

The present invention relates to a mechanical time marker and more particularly to an improved mechanism for providing continuous time information in connection with a system and apparatus for recording the listening habits or viewing habits of wave signal receiver users.

In Rahmel Patent 2,660,508, assigned to the same assignee as the present application, there is disclosed and claimed an improved arrangement for providing specific time information on a record receiving element upon which record receiving element there is already recorded information with respect to the tuning condition of wave signal receivers. The present invention is concerned with another arrangement for placing time information on a record receiving element in a fool-proof manner.

Instrumented methods of determining the listening habits or viewing habits, in the case of television, of wave signal receiver users generally employ recording devices operating in conjunction with one or more receivers in a plurality of sample homes to record as a function of time the wave signal transmitters to which the receiver is tuned for signal reception. The sample homes are chosen so as to be representative on a nation-wide basis of the listening or viewing audience, as well as for any area under consideration as, for example, the entire United States.

The usual device of this character which is associated with one or more receivers in the particular sample or colaborator home embodies facilities for driving a record receiving element upon which element record indications are produced. Preferably this record receiving element is driven at a constant speed. In some installations the position of the record indications transversely of the record receiving element is indicative of the particular transmitter to which the receiver is tuned. In another embodiment, the tuning conditions are converted to a binary code which code is recorded on the record receiving element, the latter being desirable from the standpoint of high speed automatic decoding.

In order to eliminate a substantial cost factor in the sampling process of collecting the recorded information from the sample or collaborator homes and transmitting the same to an analysis organization where the recorded information is converted to usable data from the standpoint of radio advertising and the like, it has been suggested to employ mailable magazines containing the record receiving element, which magazines are removed and mailed to the analysis organization by the collaborator. Preferably, the magazines which are to be associated with the recorder are periodically mailed to the collaborator and he replaces the magazine containing the recorded information with such magazine supplied to him by the analysis organization. By having the collaborator replace the magazine and mail it directly to the analysis organization, it is not necessary for the field man to call at the sample home as often, whereby the cost of operating the system is greatly reduced, particularly where the sample homes are disposed in widely scattered areas. When employing these magazines with the colaborator functioning as a field man without charge in so far as replacing the magazines is concerned, it is absolutely essential as discussed in the above mentioned copending Rahmel application, that some independent and more or less fool-proof time information be applied to the record while it is being made which time information may permit the analysis organization accurately to orientate the record with respect to a predetermined calendar period. In the above mentioned copending Rahmel application, this fool-proof time information was provided by means of what is commonly referred to as a "time mark radio." In each collaborator's home the recording equipment included a so-called "time mark radio" which was a fixed tuned receiver tuned to receive the carrier from a particular transmitting station preferably a clear channel station and to produce indications on the record receiving element of the "sign-off" or "sign-on" time or both of the particular transmitter to which the fixed tuned receiver is tuned. The "sign-off" and "sign-on" times which differ slightly every day and to a greater extent on week ends, provides a very unique time check. Unfortunately, there are locations where a sample home is necessary where no clear channel station is available and in such locations difficulty has been encountered with the time mark radio not producing the desired time information under certain conditions when radio propagation is not at its best. If such fool-proof time information is not applied to the record receiving element, then it may be impossible to use the recorded information due to the fact that it may be inaccurate. As a result, a high percentage of recorded information from sample homes might be worthless and to avoid this, it is desirable to provide another means for recording fool-proof time information.

If there were any assurance that the record receiving element would be moved at a constant speed throughout the recording period which preferably amounts to a week or two at a time, then no additional time information need be applied to the record receiving elements. However, extensive tests have demonstrated that in a system of recording the listening and viewing habits of wave signal receiver users, sixty percent of the record receiving elements in each thirty-day period had at least one power outage. Since these power outages may comprise anything from a fraction of a minute to many hours, it is essential that some time information which is independent of the operation of the record receiving element and recording device be applied. It has been suggested to use mechanical clocks to apply the time information, but such mechanical clocks produce a cumulative error which varies with temperature and the like so that, unless checked at short intervals, the error of the recorded time information is intolerable. If it is necessary to have a field man call at short intervals to check the time clock and set it accurately, then all the advantage gained by employing a mailable magazine is lost by virtue of the frequency of attention required of the field man. Consequently, it would be desirable to provide improved time information which is almost as unique as the time mark radio referred to above and which is usable in localities where the time mark radio does not function successfully.

Accordingly, it is an object of the present invention to provide an improved means for providing time information to associated recording apparatus.

It is another object of the present invention to provide a new and improved mechanical time marker for providing time information on a record receiving element simultaneously with the recording of other information thereon.

It is a further object of the present invention to provide an improved magazine type of recording device with improved means for recording time information on the record receiving element employed therein.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

The mechanical time marker of the present invention comprises an electrically wound mechanical clock which has its operation continuously checked against that of a synchronous electric clock so that the average error of the mechanical clock is known at all times. If the starting time is known accurately, then all succeeding time intervals can be determined by the mechanically driven clock even though the mailable magazine is replaced many times and even though the mechanical clock has a large cumulative error, since this error in time can be checked by the accurate time kept by the synchronous clock. Actually this error only has significance when power outages occur since the synchronous clock otherwise accurately determines the time. The mechanical clock carries the time through the period of power outage so that time before as well as after the power outage can be determined with great accuracy. Additionally, the mechanical clock may be provided with regulating means automatically and continuously regulated by the synchronous clock so that when a power outage occurs, the mechanical clock will be running as close to accurate time at the time the power outage occurs as is possible thus providing the ideal conditions for maintaining great accuracy.

Figure 1:
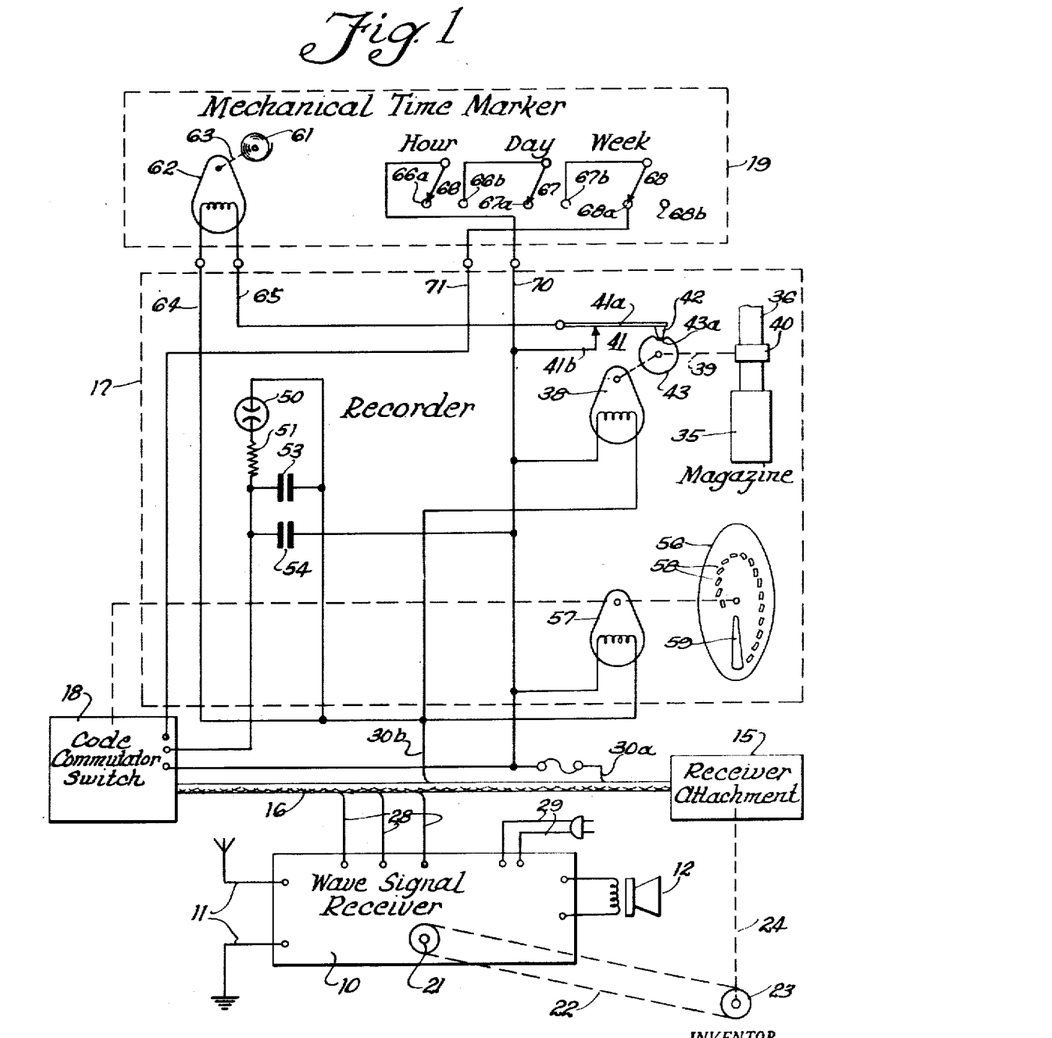
Fig. 1 is a schematic representation of a system employing the improved time marking means of the present invention with numerous parts thereof illustrated in block diagram.
Figure 2:
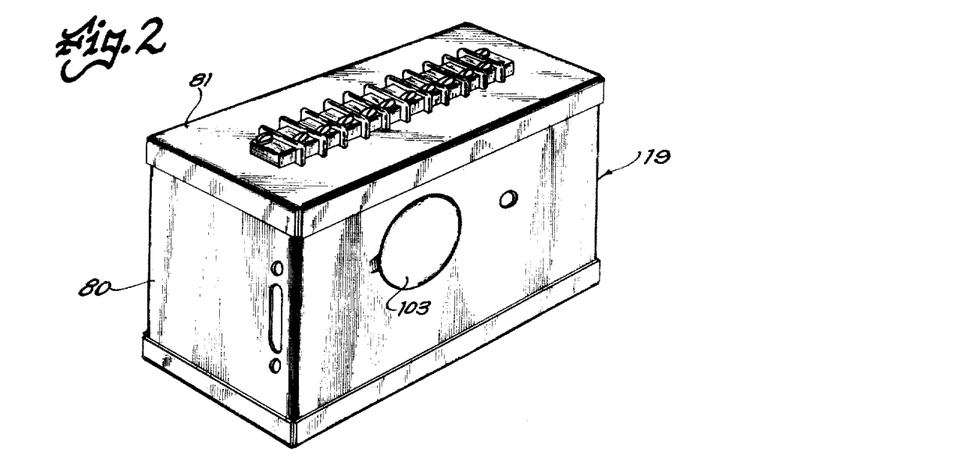
Fig. 2 is a perspective view of a commercial embodiment of the time marking unit of the present invention.

In the schematic diagram of Fig. 1, the mechanical time marker of the present invention has been illustrated as applied to a system substantially identical with that disclosed in copending Krahulec application Serial No. 147,302 filed March 2, 1950 and also assigned to the same assignee as the present application. Certain of the elements disclosed in Fig. 1 are merely disclosed in block diagram and not described with the particularity with which they are set forth in the aforesaid Krahulec copending application. They are, however, preferably identical with the corresponding parts in the copending Krahulec application.

It will be understood from the following description that various features of the present invention are applicable to the many systems and apparatus employed heretofore for determining the listening or viewing habits of a radio or television audience. For the purpose of fully disclosing the present invention, it is illustrated in connection, as was mentioned above, with the mechanism disclosed in the copending Krahulec application wherein the recording apparatus is generally disposed in a position not too far removed from the wave signal receiver being monitored. Such an installation comprises a cable connection between the monitored receiver and the recording apparatus. It should be understood, however, that the present invention may be applied to any system in which accurate time information independent of that provided by the recording apparatus is desired and which time information must be available without attention for time intervals as great as three or four months.

Referring now to Fig. 1 of the drawings, there is illustrated schematically a wave signal receiver generally designated at 10, the tuning condition of which it is desired to monitor. In other words, information is desired as to the pass bands or channels to which the receiver 10 is tuned with respect to time and as described hereinafter a continuous record of such tuning conditions with respect to time is made. The receiver 10 may be any type of receiver whether it be for amplitude modulated or frequency modulated signals or both or whether the signals are eventually converted to visible or audible form or both. As illustrated, the wave signal receiver 10 is schematically indicated as comprising an antenna ground circuit 11 and a signal reproducer schematically designated as a loud speaker 12. It should be understood that the signal reproducer 12 might equally well comprise a fluorescent screen or similar apparatus. Interposed between the antenna ground circuit 11 and the signal reproducer 12 are the usual stages, not shown, of a wave signal receiver. Since the receiver 10 is representative of any conventional wave signal receiver whether it be a radio receiver or television receiver, its mode of operation will readily be understood by those skilled in the art and consequently no further discussion thereof is included in this application.

In order to record the tuning condition of wave signal receiver 10, there is associated therewith a receiver attachment generally designated at 15, a cable connector 16 connecting the receiver attachment with a suitable recorder generally designated at 17, which recorder also includes a code commutator switch generally designated at 18, and the mechanical time marker of the present invention generally designated at 19. The receiver attachment 15, the cable connector 16 and the code commutator switch 18 have been indicated by block diagram or similar schematic form since these elements are fully described in the copending Krahulec application referred to above. Essentially, the receiver attachment is a device for converting the various tuning positions of the wave signal receiver 10 to some sort of response indicative of the tuning condition of the receiver. Practically every wave signal receiver is provided with some sort of resonant frequency varying means often controlled by the tuning shaft of the receiver although in the case of push button controls, it is possible that the position of the tuning shaft is not varied. In any event, it is usually desirable to convert the mechanical tuning positions of the receiver to some electrical indication and, as illustrated in Fig. 1 of the drawings, the receiver attachment is connected mechanically with the tuning shaft of the receiver, the latter being designated by the reference numeral 21. As schematically indicated, the tuning shaft 21 is connected by means of the Bowden wire or other means 22 with a pulley 23 connected to a rotatable shaft 24 leading to the receiver attachment. To convert the mechanical position of the tuning shaft 21 to a readily transmittable indication such as an electrical signal, the receiver attachment 15 includes a position switch preferably of the rotary type having a large number of contacts so that for different positions of the switch, a different electrical circuit is controlled. Thus, by virtue of the mechanical link comprising elements 21, 22, 23 and 24 interconnecting the receiver 10 and the receiver attachment 15 there is provided in the receiver attachment 15 means for producing a unique electrical signal for each tuning position of the receiver.

For the purpose of supplying power to the receiver attachment 15 as well as the recorder 17, the receiver attachment 15 is electrically connected to the wave signal receiver 10 by means of a plurality of conductors generally designated at 28 and the receiver is provided with the conventional power cord 29. When the receiver is connected to a power source, then power is supplied to the conductors 28 which are illustrated as partially included in the cable connections 16. This power is supplied by means of conductors 30a and 30b to the recorder 17 as well as to mechanical time marker 19 to be described in detail hereinafter. The receiver attachment of the present invention, comprising primarily a small rotary position switch, is capable of being disposed in a very small space and hence is customarily associated with the wave signal receiver 10. The recorder 17 and its associated code commutator switch 18 and mechanical time marker 19 can be located remote from the wave signal receiver 10, preferably disposed in an article of furniture so as not to be noticeable and connected to the receiver attachment by the cable connections 16. The recorder 17 may often be disposed within an end table or suitable cabinet located near the receiver 10. The reason for this is obvious, since it is generally undesirable to have a substantial length of cable extending between the receiver attachment and the recorder. Where remote positioning of the receiver attachment and the recorder 17 is desirable, the cable 16 interconnecting the two is dispensed with and some other type of link such as a space link or a link employing the power lines as a carrier for the signals may be substituted. In the latter case, the code commutator switch 18 normally associated with the recorder 17 is associated with the receiver attachment thereby dispensing with the large number of conductors between the recorder and the position switch which are necessary to interrelate the position switch disposed in the receiver attachment 15 and the code commutator switch 18.

For the purpose of converting the electrical response of the position switch defined in the receiver attachment 15 and indicative of the position of the tuning shaft 21 to a readily recordable and decodable response, the code commutator switch 18 referred to above is provided. This switch is merely shown in block diagram in Fig. 1, since it is fully disclosed in the above mentioned Krahulec application. It preferably comprises a plurality of rotary switch contacts arranged to convert the electrical response to a binary code. This code commutator switch is preferably rotated at a constant speed such as one revolution per minute, as will be described in greater detail hereinafter, which means that for a particular tuning position of the receiver 10 a predetermined code will be produced once each revolution of the code commutator switch and this code will change for different tuning positions of the receiver 10. With such binary code, it is possible in four angular positions of the coding switch to produce fifteen combinations.

The recorder 17 of the present invention is preferably identical with that disclosed in the above mentioned Krahulec application except for the mechanical time marker 19 and comprises a mailable and replaceable magazine 35 into which is fed a record receiving element such as 36 which may be for the particular embodiment illustrated photographic film. For the purpose of moving the record receiving element 36 in some predetermined manner with respect to time, the recorder 17 includes a film drive motor 38 drivingly connected by a shaft 39 with a friction drive roller 40 preferably to rotate the latter at a speed of the order of one-half revolution per hour thereby to move the film or record receiving element 36 a predetermined distance during one revolution of the shutter disk to be described hereinafter, which distance is approximately the width of a target slit. Preferably also the film drive motor 38 operates a cam switch 41 comprising relatively movable contacts 41a and 41b operated by a cam follower 42 associated with a cam 43 rotatable at about one-half revolution per hour by the film drive motor 38. The cam 43 is provided with a short dwell portion or recess 43a so as to close the switch 41 (closed position indicated in Fig. 1 of the drawings) for a few minutes such as two or three minutes during a predetermined time interval which may be one hour, two hours or some other period of time. During the remainder of the predetermined time interval the switch 41 is open. The switch 41 is employed, as will become apparent from the following description, to close a circuit for a spring winding motor of the mechanical time marker 19 in a manner which will readily become apparent from the following description.

To cause the pulses produced by the code commutator switch 18 to produce a record on the movable record receiving element 36, which is illustrated preferably as photographic film, there is provided a suitable lamp generally designated at 50 which is energized in response to these pulses to expose predetermined portions of the film 36. To insure long life, the lamp 50, preferably an argon lamp or the like, is connected in series with a current limiting resistor 51. The argon lamp 50 is connected across the power circuit 30a and 30b through the code commutator switch 18 as well as the receiver attachment 15. This is for the purpose of causing the light or lamp 50 to be energized to produce certain code indications in dependence upon the tuning position of the receiver attachment 15 and also in dependence upon other particular conditions which it is desirable to record on the recording element 36. Since this lamp 50 is energized once per minute and sometimes several times per minute depending upon the number of indications to be produced on the record tape 36, it is desirable to provide a suitable filter to prevent radio interference. Accordingly a suitable noise suppressor circuit is provided comprising capacitors 53 and 54, the former connected across the serially arranged lamp and resistor 50 and 51 respectively, and the latter connected across various contacts of the code commutator switch 18.

In order to cause the lamp 50 to expose portions of the film 36 in a desired predetermined manner, so the code indications are produced in correct positions across the record receiving element 36, it is necessary to expose predetermined transverse portions of the film 36 in synchronism with the energization of the light source 50. Accordingly, a suitable optical system is provided which includes the light source 50 and a suitable lens system not shown, together with a rotating shutter disk 56. Light from the lamp 50 passes through the lens system, not shown, and through predetermined ones of a plurality of openings defined in the shutter disk 56.

To properly correlate the rotating shutter disk 56 and the code commutator switch 18, the two are preferably driven at one revolution per minute by a suitable motor 57 which drives both elements. Should it not be possible to associate the code commutator switch 18 with the recorder 17, then two motors such as 57 will be necessary which must be driven in synchronism.

In order to cause light from the source 50 to fall on different predetermined positions transversely of the film 36 in dependence upon the pulses produced by the code commutator switch 18, the rotating shutter disk 56 is provided with a plurality of elongated openings or slits designated as 58. These slits are arranged in a spiral around the disk to cause the light to move successively across the film 36. Thus, the slits are successively presented to the light so that the film is exposed transversely beginning with one side and moving to the other. The film 36 moreover preferably moves the width of the image and one of the slits in the shutter disk during the time that the disk rotates through one revolution, so that the record will be produced on an unexposed portion of the film. The shutter disk is also provided with at least one large opening 59 for permitting the field man to view the entire film and also to produce certain unique indications on the film in the case of a power outage which is fully described in the above mentioned copending Krahulec application. In the prior Krahulec application it was suggested that the lamp 50 might be maintained energized for a period such as two minutes after power is restored following a power outage, whereupon an appropriate record would be produced upon the film 36 each time such power outage occurred.

In initially adjusting the optical system and the recorder of the present invention, the field man would see that a particular contact of the code commutator switch caused lamp 50 to be energized within the period that a particular slit is effective to transmit light from the source 50 to the film 36.

Since the rotating shutter disk 56 rotates at one revolution per minute, means are provided whereby the lamp 50 is energized once per minute in synchronism with the particular location of the shutter disk 56 to place what may be termed "minute marks" along one edge of the record and in the event that there has been no power outage, an accurate time record is provided which is placed thereon by synchronous electrical means. Due to the fact, however, that extensive experiments have indicated that power outages occur at least once per month in sixty percent of the homes where wave signal receivers are being monitored, suitable means such as the mechanical time marker 19 of the present invention are provided in order to produce a correct time record. In accordance with the present invention, the mechanical time marker 19 schematically disclosed in Fig. 1 of the drawings and better disclosed in the other figures of the drawings, comprises a mechanical clock 83 including the spring 61. This mechanical clock includes winding means in the form of an electric motor 62 which is connected directly by means of a shaft 63 to means for winding the spring 61. This winding motor may be a synchronous motor, although a synchronous motor is obviously unnecessary, any ordinary motor being satisfactory. The winding motor 62 is connected by suitable conductors 64, 65 across the power conductors 30a and 30b when the cam switch 41 is closed. Thus, two or three minutes during each predetermined period of an hour or several hours the motor 62 will wind the spring 61. Preferably this motor is of the type which is only one or two percent efficient so that it may be stalled for ninety or more percent of the time without damage. This eliminates the requirement of a clutch and the difficulties which normally would occur with having a clutch interposed between the winding motor 62 and the spring 61.

Figure 3:
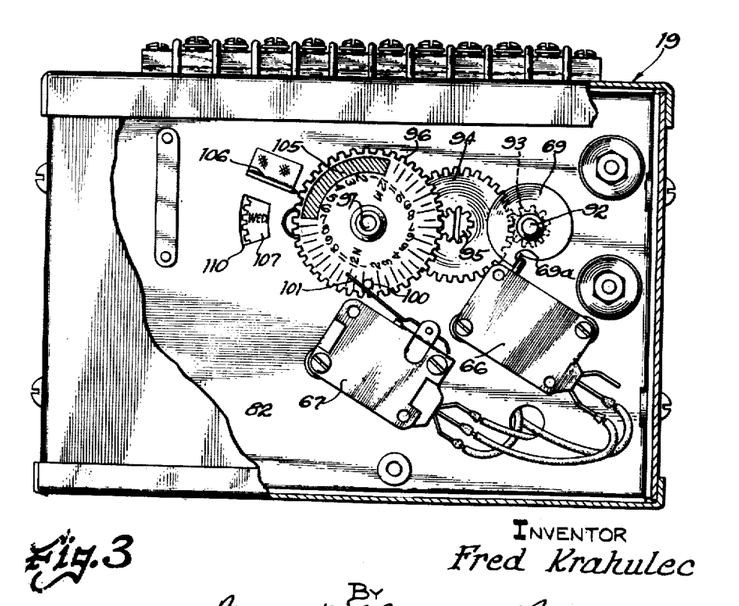
Fig. 3 is a front elevational view partly in section of the time marking unit of the present invention.
Figure 4:
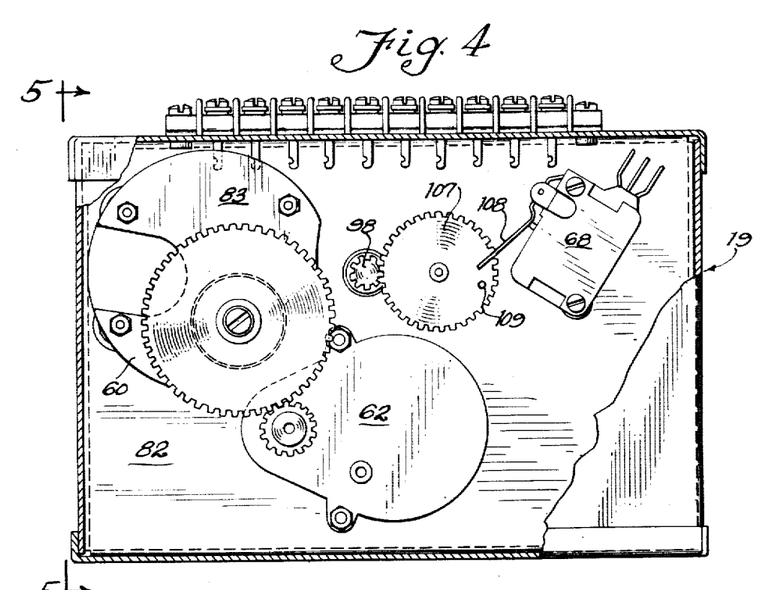
Fig. 4 is a view similar to Fig. 3 of the other side of the time marking unit with portions broken away.
Figure 5:
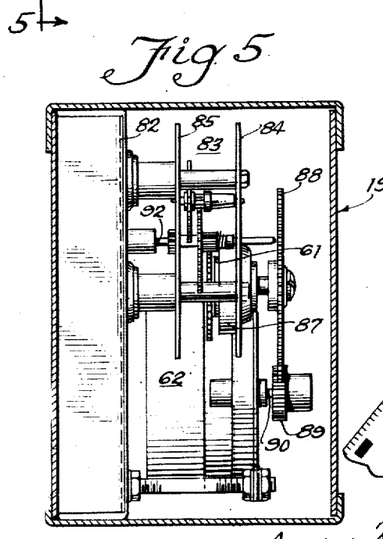
Fig. 5 is a sectional view taken on line 5—5 of Fig. 4 assuming that Fig. 4 shows the complete structure.

As schematically indicated in Fig. 1 and more clearly disclosed in Figs. 3 to 5 of the drawings, the spring driven clock motor actuates three switches, an hour switch designated at 66, a day or twenty-four hour switch designated at 67, and a week or seven day switch designated at 68. The hour switch 66 is indicated as controlled by a suitable rotatable cam 69 having a substantially instantaneous drop-off 69a to cause hour switch 66 to engage contact 66a for the major portion of the hour and to engage for a short period during each hour a contact 66b. The day switch 67, on the other hand, engages contact 67a for the majority of the period, but for an interval less than one hour the contact engages contact 67b. Similarly, the week switch 68 engages contact 68a for the majority of the week engages contact 68a, but for a period less than a twenty-four hour period engages a contact 68b. The movable switch contact of hour switch 66 is connected by means of a conductor 70 with the power conductor 30a. The stationary contact 66b is connected to the movable switch contact of the day switch 67. Similarly, the stationary contact 67b is connected with the movable contact of the week switch 68. The stationary contact 68a of the week switch 68 is connected by means of a conductor 71 through the code commutator switch 18 and the cable connection 16 with the power source so as to energize the circuit comprising conductors 70 and 71 at particular intervals depending upon the position of the hour, day and week switches, 66, 67 and 68 respectively. Like in the case of minute marks and as fully described in the above referred to Krahulec application and Rahmel Patent 2,755,-163, the commutator switch connects the power line 30a to the conductor 71 during the mechanical time mark period which occurs once each minute. During this period the one of the openings 58, hereinafter referred to as the "mechanical time mark opening," is positioned between the lamp 50 and the photographic tape, and therefore if the unit 19 interconnects the conductors 70 and 71 at this time, the lamp 50 is energized and a mark is made on the tape in the location corresponding to the mechanical time mark opening. As illustrated in Fig. 1 of the drawings, the electrical circuit between the conductors 70 and 71 is open as long as the hour switch 66 is in engagement with contact 66a. Therefore, no circuit is completed to energize the lamp 50 during the mechanical time mark period until the movable contact of the day switch 67 simultaneously engages its contact 67b when the hour switch arm engages its contact 66b. Under these conditions and for a period of several minutes the lamp 50 will be energized during successive mechanical time mark periods to produce a mechanical time mark 75 (Fig. 6) on the film in a predetermined position transversely thereof controlled by mechanical time mark opening in the shutter disc 56. It will be understood that whenever the week switch 68 has its movable contact in engagement with contact 68b, the circuit between the conductors 70 and 71 for energizing the lamp 50 to produce a mechanical time mark on the film is open. With the above described arrangement, therefore, there is placed on the film a time mark every twenty-four hours, but at the end of the week no time mark occurs. In other words, a forty-eight hour period expires without a time mark, thus giving weekly indications by the absence of a twenty-four hour time mark. In addition, the minute marks controlled by the synchronous motor 57 are also provided.

Although as specifically described above the mechanical time marked places time marks once each twenty-four hour period on the record receiving element, it should be understood that the twenty-four hour time interval is by way of example only. The mechanical time marks could actually be applied every hour or every two hours or at some other time interval. By using shorter time intervals less record is unusable, particularly if several short power outages occur during a single day.

It is a well known fact that spring driven mechanical clocks tend to vary in time, which variations are primarily due to temperature changes. The flywheel of the time mechanism expands at higher temperatures, tending to cause the clock to run slightly slower and conversely contracts at lower temperatures to cause speeding up. The error in time in any one day is usually relatively small, but cumulatively this error soon becomes sufficiently large so as not to be usable for an accurate time indication. However, with the present invention, the combination of the synchronously applied time information which is accurate at all times except when there is an electrical power outage, and the mechanical time marks, which may not be accurate and generally are not accurate, enable the analysis organization to obtain accurate time information even during a power outage, since they can readily determine the average speed of the mechanical clock which is continuously being checked by the synchronous clock, and this information will permit them readily to be correlated.

Figure 6:
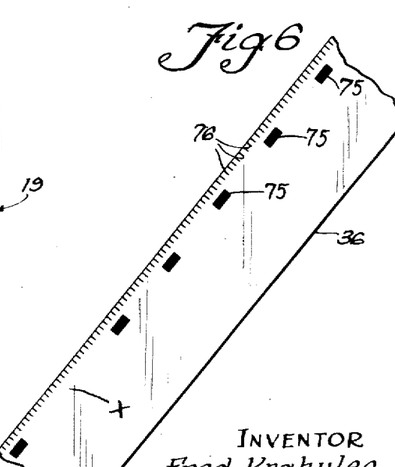
Fig. 6 is a fragmentary portion of a record strip showing the time marks produced by the present invention.
Figure 7:
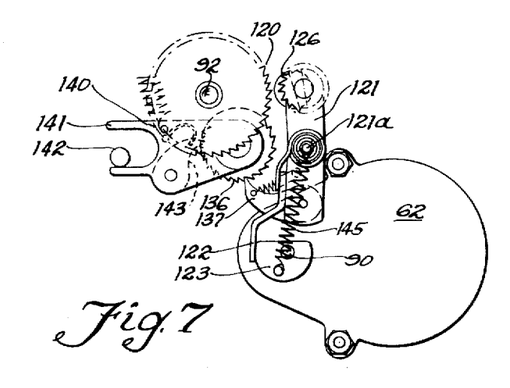
Fig. 7 is an elevational view of a mechanical clock embodying a modification of the present invention, including means for automatically regulating the mechanical clock in response to the operation of synchronous time means, with the parts shown in the position which they assume for the major portion of each one minute time period.
Figure 8:
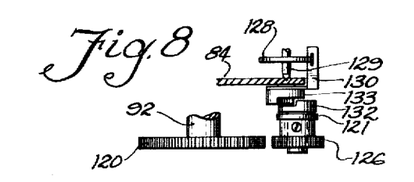
Fig. 8 is a top view of a portion of Fig. 7.

In Fig. 6 of the drawings, there is illustrated a portion of the record receiving element 36 indicating thereon the mechanical time marks 75 and the minute marks 76. Actually the time scale is distorted for purposes of illustration, since between successive twenty-four hour marks 75 there should be 1440 minute marks. Obviously this is not possible in the small space allotted to Fig. 6. The absence of a mechanical time mark at about point X indicates that the week interval has gone by since there is no evidence of a power outage. The absence of a mechanical time mark at the end of each week has been found by experience to be a very simple and satisfactory means of indicating the end of a week since extensive tests on a large number of systems have indicated that the occurrence of a power outage on each of two successive days has been found to be very rare indeed.

The specific structural details of a commercial embodiment of a mechanical time marker 19 is disclosed in Figs. 2 to 5 of the drawings. This mechanical time marker 19 is illustrated as comprising a casing 80 having a cover or closure member 81, preferably both of sheet metal construction. The casing is very compact and in the commercial embodiment had dimensions of the order of 4" by 3" by 6". Supported from the cover 81 so as to depend into the casing 80 is a mounting panel 82, on either side of which are mounted elements, many of which have already been described, such as the synchronous motor 62, the switches 66, 67 and 68 and the like.

Considering first Figs. 4 and 5 of the drawings, the mechanical clock of the present invention is generally designated by the reference numeral 83 and comprises a frame including elements 84 and 85 which are supported from the supporting panel 82. The conventional clock mechanism is associated with the supports 84 and 85, including the clock spring 61 which is housed within a drum 87. The drum 87 is capable of being rotated in response to rotation of a gear 88 drivingly connected to a gear 89 mounted on the drive shaft 90 driven by the synchronous motor 62. Rotation of the shaft 90 will cause winding of the spring 61 and, as has been pointed out above, when the spring is fully wound the synchronous motor 62 merely stalls. The mechanical clock mechanism 83 includes an hour shaft 92 which extends through the panel 82 and has supported on one end thereof the hour cam 69, already described above, best shown in Fig. 3 of the drawings.

For the purpose of actuating the twenty-four hour switch 67, there is also mounted on the hour shaft 92 a gear 93 which is drivingly connected to rotate a gear 94 mounted on a shaft journaled in the depending support 82. The gear 94 is drivingly connected through a small gear 95 with a gear 96 mounted on a shaft 97 also journalled in the depending support 82 and actually extending through the support 82 so as to have drivingly connected thereto a gear 98, best shown in Fig. 4 of the drawings. The gear 96 makes one revolution during each twenty-four hour period and is provided on the face thereof with a pin 100 for actuating once during each twenty-four hour period a so-called day or twenty-four hour switch 67. To this end, the twenty-four hour switch 67 is provided with a pivotally mounted lever 101 which is effectively a switch actuating means engageable by the pin 100.

From the above description, it will be apparent that the closure or actuation of the twenty-four hour switch 67 for a predetermined period once each day is not critical and the arrangement is preferably such that the switch is actuated for a period less than an hour, whereupon there will be an overlapping time period when switches 66 and 67 are simultaneously actuated.

For the purpose of permitting the field man accurately to set the mechanical time marker 19, the twenty-four hour gear 96 has preferably defined on the face thereof, suitable indicia, as clearly shown in Fig. 3 of the drawings to indicate the hours during a twenty-four hour period. This gear 96 is located opposite a suitable opening defined in the housing 80, which opening is closed by suitable closure member 103, preferably of the spring latched type. The field man may remove the closure 103 and view the setting of the gear 96. To facilitate the reading of the twenty-four hour gear 96, a portion thereof, between midnight and five or six o'clock in the morning, when radio and television listening is not likely to occur, is blacked out, as indicated at 105. A suitable index 106 adjacent the gear 96 aids the field man in initially setting the mechanical clock. It will be understood that the pin 100 for actuating the twenty-four hour switch 67 might be located any place on the gear 96. It is specifically indicated as being physically located on the disk between the time indicia designating one and two o'clock in the afternoon. This means that the day switch 67 is operated for a period somewhat less than an hour between six and seven in the morning since this is the time designated by the index 106 when the switch 67 is operated. Thus every morning the mechanical time marker 19 should cause the movable switch contact of the twenty-four hour switch 67 to engage contact 67b.

In order to actuate the week or seven day switch 68, the gear 98, which makes one revolution per day, is drivingly connected to a seven day gear 107, the gear ratios of the gears 98 and 107 being such as to cause the gear 107 to make one revolution per week. The seven day switch 68 is furthermore provided with a lever 108 substantially like lever 101 of the twenty-four hour switch 67 and this lever is actuated by a suitable pin 109 on the face of the gear 107. The arrangement is preferably such that the switch 68 is actuated once a week for a period somewhat less than twenty-four hours.

In order that the field man may know the particular day setting of the mechanical time marker, the seven day gear 107 is provided on its face adjacent depending support 82 with indicia indicating the day of the week and this indicia is visible through an opening 110 in the depending support 82, as is clearly obvious from Fig. 3 of the drawings.

In view of the detailed description included above, the operation of the mechanical time marker 19 of the present invention will readily be understood by those skilled in the art. The mechanical time clock 83, through the energy stored in the clock spring 61, drives the hour cam 69, the twenty-four hour gear 96, and the seven day gear 107 with the corresponding actuation of the associated switches 66, 67 and 68, respectively. The hour switch cam 69 causes accurate control of the hour switch 66 within the limits of accuracy of the mechanical clock 83 and in view of the circuitry described above, the operation of the switches 67 and 68 are not critical, since the hour switch 66 provides the desired accuracy. All that is necessary is for the switches 67 and 68 to be closed or actuated during the time at the end of a twenty-four hour period and at the end of a seven day period when the hour switch 66 is actuated by hour cam 69, whereupon the mechanical time indications designated as 75 in Fig. 6 of the drawings are produced once each twenty-four hour period except at the end of the week, when a forty-eight hour period elapses between successive marks 75. If the mechanical time clock is absolutely accurate and no power outage occurs, there will be 1440 minute marks 76 between successive mechanical time marks 75. If there are more or less, the analysis organization will readily see that the time clock is running slow or fast and the synchronous minute marks will provide an accurate check on the mechanical time marker. Should there be a power outage, the mechanical time marker will continue to operate and the average error in the mechanical time clock being known to the analysis organization, there is provided a very accurate time check at all times. Moreover, when the field man places the initial time information on the record receiving element 36, the analysis organization is able to calculate accurate time from that reference base even though the mechanical time clock may be in error by a substantial amount at the end of a period of time such as three or four months, which error might even amount to several hours. As a practical matter, mechanical time clocks have a cumulative error over a period of three or four months which may run up to several hours.

In accordance with a further embodiment of the present invention the mechanical clock 83 may be provided with means for continually adjusting the same to tend to maintain an accurate setting at all times in response to control from synchronous time means. With such an arrangement, it is clear that when a power outage occurs, the mechanical clock will be running so as to maintain substantially accurate time at the instant of power outage and moreover, adjusted in the optimum fashion for continuing to maintain such accurate time. Such a modification is shown in Figs. 7 to 12 of the drawings and comprises an arrangement for checking the mechanical clock position once per minute. This can be accomplished by checking the angular position of the minute hand shaft (designated as hour shaft 92 in Fig. 5 of the drawings) of the mechanical clock with the angular position of the shaft of a synchronous electric motor and providing a correction of the regulator lever of the mechanical clock to cause it to operate at a rate which is a function of the average rate of the electric clock. To this end, the hour shaft, generally designated at 92, which makes one revolution per hour, and is given the same reference numeral as in Fig. 5 of the drawings, has attached thereto a sixty tooth reference wheel 120, one tooth being provided for each minute.

For the purpose of comparing the angular position of the reference wheel 120 with the angular position of a synchronous motor shaft, there is provided a synchronous motor which may be the synchronous motor 62 for winding the clock spring such as 61, and in Figs. 7 to 12 of the drawings, the synchronous motor has been designated by the reference numeral 62. However, unlike the synchronous motor 62 employed in Fig. 1 of the drawings, which is stalled a large percentage of the time, the synchronous motor 62 must be continuously operative to rotate shaft 90 at one revolution per minute, except when power outages occur. Hence, as will be described hereinafter, either a separate motor for winding the clock spring 61 must be provided, or means to be described driven from the motor 62 may be employed to wind the clock spring 61. As illustrated, there is pivotally mounted, as indicated at 121a, to a suitable frame, such as the clock frame 84 of Fig. 5 of the drawings, an actuator arm 121 provided with an extension 122 defining a cam follower for engagement with a suitable cam 123 driven by the synchronous motor shaft 90 at one revolution per minute. The cam 123 is so designed that for substantially the entire period of one minute, the actuator arm 121 is moved in a clockwise direction to its maximum extent as viewed in Fig. 7 of the drawings, and for only a very short interval during the one minute period is the actuator arm 121 permitted to move slightly in a counterclockwise direction as viewed in Fig. 11 of the drawings. A suitable torsion spring 124 biases the actuator arm in a direction to maintain engagement of the cam follower 122 with the cam 123.

Figure 9:
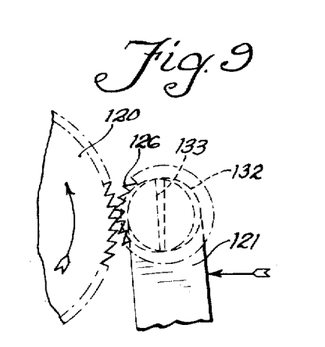
Fig. 9 is an enlarged detail view of a portion of Fig. 7 showing what happens when the mechanical clock does not remain in phase with the synchronous time means.
Figure 10:
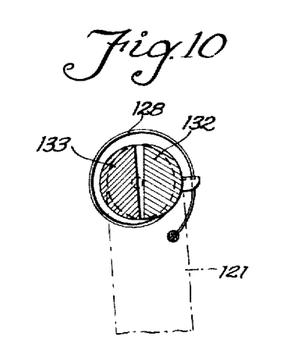
Fig. 10 is a sectional view through a portion of Fig. 9.

Pivotally mounted to the free end of the actuator arm 121 is a regulator gear 126 which engages the sixty tooth reference gear 120 once each minute for the short interval of time that the cam 123 permits this to occur. During this one minute interval, the sixty tooth reference wheel 120 should move forward exactly the distance of one tooth and if the mechanical clock is operating at the correct rate each time the regulator gear 126 moves into engagement with the reference wheel 120, the two gears should be exactly in phase, whereupon the reference gear 126 will remain stationary. If, however, the rate of speed of operation of the mechanical clock is incorrect, the succeeding reference gear teeth of the reference wheel 120 will display a phase shift relative to the regulator gear 126 as indicated in Fig. 9 of the drawings and will cause a slight rotation of the regulator gear 126, either forward or backward, depending upon the direction of the phase displacement. Hence, the angular position of the regulator gear 126 can be utilized to adjust the conventional regulator of the mechanical clock. Conventionally, such mechanical clocks employ an oscillating flywheel and have a torsion spring such as 128, mounted on the oscillating shaft 129 supporting the flywheel, which in turn controls the escapement mechanism of the clock. This torsion spring may have the tension thereof adjusted by a conventional clock regulating lever 130 which, when moved in one direction, causes an increase in speed of the clock and when moved in the other direction tends to decrease the speed of the clock.

Figure 12:
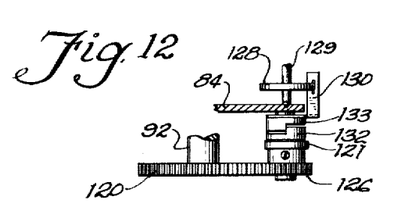

In order that the regulator gear 126 may control the position of the clock speed regulator lever 130 while still permitting oscillating movement of the actuator arm 121, a sort of a clutch arrangement is employed, which comprises a semicircular cam 132 drivingly connected to the regulator gear 126 and a cooperating semicircular cam 133 connected to the clock speed regulating lever 130. When the regulator gear 126 and the reference wheel 120 are in engagement as shown in Fig. 12 of the drawings, the semicircular cams 132 and 133 are in driving engagement so that any rotation of the regulating gear 126 will rotate the regulator lever 130 in a direction to tend to correct for the error in clock speed which has resulted in the rotation of the regulator gear 126. Thus any movement of the regulator gear 126 is in such direction that the clock rate error is compensated for and the normal rate is achieved. It will be apparent that with this arrangement a regulator setting for the mechanical clock is obtained, which will provide most accurate operation of the mechanical clock under temperature conditions existing at the time a power failure occurs. Moreover, during normal periods when no power outage occurs, the time indicated by the mechanical clock is indicated with synchronous clock accuracy so that corrections by the analysis organization for varying clock rate are not necessary.

It will be understood that a separate clock motor may be employed to wind the clock spring 61 even though the regulating means of Figs. 7 to 12 are employed. However, in Figs. 8 and 12 there is illustrated an arrangement whereby the same motor 62 may be used, not only to control the regulation of the mechanical clock, but also to keep the clock spring 61 wound. For this purpose there is attached to the winding drum of the clock spring a winding gear 136 which is provided with suitable ratchet teeth for engagement with a ratchet pawl 137 connected to the actuating arm 121. Swinging movement of the actuator arm 121 will continually advance the spring winding gear 136 to maintain the same in wound condition. In order to take care of the situation when the clock spring is fully wound, the winding drum is mounted for limited pivotal oscillation, which is controlled by a lever 140 having prongs 141 disposed one on either side of a post 142. The lever 141 is provided with a pawl 143 engaging with the ratchet teeth of the spring winding gear 136. When the spring is fully wound, the actuating pawl 137 merely causes pivotal movement of the lever 140 and slight oscillating movement of the drum which, upon the backstroke of the pawl 137, merely resets itself. In other words, when the clock spring 61 is fully wound, the pawl 137 merely causes oscillating movement of the lever 140 with no relative movement between the winding gear 136 and the ratchet 143.

Figure 11:
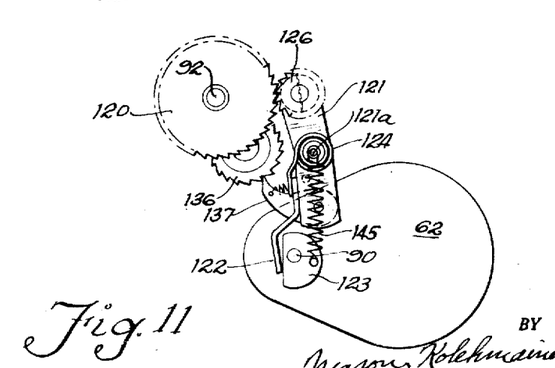
Figs. 11 and 12 are views corresponding to Figs. 7 and 8, respectively, illustrating the position the parts assume only for a very short interval of time during each one minute period.

It will be understood that if a power outage occurred at the instant the gears 120 and 126 were engaged as indicated in Figs. 11 and 12 of the drawings that the gear 120 would cause undesirable rotation of gear 126 under these conditions. To avoid this there is provided a spring 145 which will rotate cam 123 out of the position shown in Fig. 11 in the event of a power outage at that instant. Motor 62 is preferably one in which the drive to shaft 90 is interrupted upon deenergization of the motor whereupon spring 145 can rotate cam 123 slightly to disengage gears 120 and 126. When the motor 62 is energized spring 145 is ineffective to cause any movement of cam 123. Any other means for accomplishing this result may be employed.

In view of the detailed description included above, the operation of the electrically regulated mechanical clock of Figs. 7 to 12 will readily be understood by those skilled in the art, and no further discussion is included herewith.

Although the present invention is particularly well adapted for use where a mailable magazine type recorder is employed, it should be understood that the invention is applicable whenever unskilled people are used to gather up the recorded information, whether or not a magazine is employed, and they do not or are not capable of placing accurate time information on the record at the beginning and end of each record. In the illustrated embodiment the record receiving element does not move during a power outage period. It should be understood that means for moving the same during such power outage period could be provided whereby an accurate time record even during a power outage period may be determined.

While there have been illustrated and described several embodiments of the present invention, it should be understood that various modifications will occur to those skilled in the art. Accordingly, it is aimed, in the appended claims, to cover all such changes and modifications as fall within the true spirit and scope of the present invention.

What is claimed as new and desired to be secured by Letters Patent of the United States is:

1. In a recording device of the mailable magazine type for producing a record with respect to time on a movable record receiving element in which the record receiving element at least following completion of the recording operation is contained in said magazine, means operative by synchronous electrical means for placing periodic time marks on said element, and a mechanical clock driven means for placing additional time marks on said record concurrently with said synchronous means whereby said synchronous means provides a check on said mechanical clock so that during periods of electrical power outages a correction based on said check during non-power outage periods permits accurate time determination for time following the end of the power outage.

2. In a recording device of the mailable magazine type for producing a record with respect to time on a movable record receiving element in which the record receiving element at least following completion of the recording operation is contained in said magazine, means operative by synchronous electrical means for placing periodic time marks once each minute on said element, and a mechanical clock driven means for placing additional time marks on said record concurrently with said synchronous means whereby said synchronous means provides a check on said mechanical clock so that during periods of electrical power outages a correction based on said check during non-power outage periods permits accurate time determination both before and after said power outage.

3. In a recording device for producing a record with respect to time on a movable record receiving element, synchronous time control means for placing periodic time marks on said element, and a spring driven mechanical clock means for placing additional time marks on said record concurrently with the record produced by said synchronous means, said synchronous means providing a continuous check on said mechanical clock means whereby during a period of electrical power failure with resultant deenergization of said synchronous time control means a correction may be applied to the time record produced by said mechanical clock means based on said check during periods when no power failure occurs thereby permitting an accurate time determination both before and after said power outage.

4. In a recording device of the mailable magazine type for producing a record with respect to time on a movable record receiving element in which the record receiving element at least following completion of the recording operation is contained in said magazine, synchronous time control means for placing time marks on said element once each minute, and a spring driven mechanical clock means for placing additional time marks one during each twenty-four hour period on said record concurrently with the record produced by said synchronous means, said synchronous means providing a continuous check on said mechanical clock means whereby during a period of electrical power failure with resultant deenergization of said synchronous time control means a correction may be applied to the time record produced by said mechanical clock means based on said check during periods when no power failure occurs thereby permitting an accurate time determination.

5. In a recording device for producing a record with respect to time on a movable record receiving element in which the record receiving element, synchronous time control means, means controlled by said synchronous time control means for placing periodic time marks on said element, a spring driven mechanical clock means, and means controlled by said mechanical clock means for placing additional time marks on said record concurrently with the record produced by said means controlled by said synchronous time control means, said synchronous time control means providing a continuous check on said mechanical clock means whereby during a period of electrical power failure with resultant deenergization of said synchronous time control means a correction may be applied to the time record produced by said mechanical clock means based on said check during periods when no power failure occurs thereby permitting an accurate time determination.

6. In a recording device for producing a record with respect to time on a movable record receiving element, means for producing a record on said record receiving element, synchronous time control means, means responsive to operation of said synchronous time control means for actuating said first mentioned means to place synchronously controlled periodic time marks on said element, a spring driven mechanical clock means, and means responsive to operation of said mechanical clock means for actuating said first mentioned means to place additional time marks on said record concurrently with the record produced by said synchronous means, said synchronous means providing a continuous check on said mechanical clock means whereby during a period of electrical power failure with resultant deenergization of said synchronous time control means a correction may be applied to the time record produced by said mechanical clock means based on said check during periods when no power failure occurs thereby permitting an accurate time determination both before and after a power outage.

7. In a recording device for producing a record with respect to time on a movable record receiving element, synchronous time control means for continuously placing minute marks on said element as long as there is no electrical power failure, a spring driven mechanical clock means for continuously placing additional time marks on said record concurrently with the record produced by said synchronous means, said synchronous means providing a continuous check on said mechanical clock means whereby during a period of electrical power failure with resultant deenergization of said synchronous time control means a correction may be applied to the time record produced by said mechanical clock means based on said check during periods when no power failure occurs thereby permitting an accurate time determination both before and after a power outage, and electrical means for maintaining said spring driven mechanical clock in a wound condition.

8. Apparatus for recording information relative to the particular transmitting stations to which a wave signal receiver is tuned, comprising a recording mechanism having a readily removable mailable magazine associated therewith for containing a record receiving element at least following completion of the recording operation during which indications of the tuning condition of said receiver are produced on said element, means periodically operative by synchronous electrical means for placing time marks on said element, and a mechanical clock driven means for placing additional time marks on said record concurrently with said synchronous means, said synchronous means providing a continuous check on the operation of said mechanical clock whereby during periods of electrical power outages a correction based on said check during non-power outage periods permits accurate time determination thereby accurately correlating the record of the tuning condition of said receiver with respect to time.

9. Apparatus for recording information relative to the particular transmitting stations to which a wave signal receiver is tuned, comprising a recording mechanism including a record receiving element upon which record indications of the tuning condition of said receiver are produced, means periodically operative by synchronous electrical means for placing time marks on said element, and a mechanical clock driven means for placing additional time marks on said record concurrently with said synchronous means, said synchronous means providing a continuous check on the operation of said mechanical clock whereby during periods of electrical power outages a correction based on said check during non-power outage periods permits accurate time determination, said mechanical clock driven means placing a time mark on said element once during each twenty-four hour period except at the end of a seven day period whereby the omission of such mark at the end of a seven day period indicates the termination of a week.

10. In a recording device of the mailable magazine type for producing a record with respect to time on a movable record receiving element in which the record receiving element at least following completion of the recording operation is contained in said magazine, means operative by synchronous electrical means for placing periodic time marks on said element, a mechanical clock driven means, a cam controlled switch, means actuated by said mechanical clock driven means for operating said cam controlled switch once an hour, a twenty-four hour switch actuated by said mechanical clock driven means once during each twenty-four hour period, a seven-day switch actuated by said mechanical clock driven means once during each week, and means responsive to the simultaneous actuation of said cam controlled switch and said twenty-four hour switch without actuation of said seven-day switch to produce additional time marks on said record one mark at the end of each twenty-four hour period, and means responsive to the actuation of said seven-day switch to prevent the production of the time mark which would otherwise occur at the end of each week.

11. In a recording device for producing a record with respect to time on a movable record receiving element, means operative by synchronous electrical means for placing periodic time marks on said element, a mechanical clock driven means, a cam controlled switch, means actuated by said mechanical clock driven means for operating said cam controlled switch once an hour, a twenty-four hour switch actuated by said mechanical clock driven means once during each twenty-four hour period, a seven-day switch actuated by said mechanical clock driven means once during each week, and means responsive to the simultaneous actuation of said cam controlled switch and said twenty-four hour switch without actuation of said seven-day switch to produce additional time marks on said record one mark at the end of each twenty-four hour period, and means responsive to the actuation of said seven-day switch to prevent the production of the time mark which would otherwise occur at the end of a week.

12. Apparatus for recording information relative to the particular transmitting stations to which a wave signal receiver is tuned, comprising a recording mechanism including a record receiving element upon which record indications of the tuning condition of said receiver are produced, means periodically operative by synchronous electrical means for placing time marks on said element, and a mechanical clock driven means for placing additional time marks on said record concurrently with said synchronous means, said synchronous means providing a continuous check on the operation of said mechanical clock whereby during periods of electrical power outages a correction based on said check during non power outage periods permits accurate time determination at all times even during a power outage thereby accurately correlating the record of the tuning condition of said receiver with respect to time.

13. Apparatus for recording information relative to the particular transmitting stations to which a wave signal receiver is tuned, comprising a recording mechanism including means for receiving a record receiving element upon which record indications of the tuning condition of said receiver are produced, means periodically operative by synchronous electrical means for placing time marks on said element, a mechanical clock driven means for placing additional time marks on said record concurrently with said synchronous means, said synchronous means providing a continuous check on the operation of said mechanical clock, means for periodically comparing the phase relationship of parts of said synchronous means and mechanical clock driven means which should rotate at the same speed, and means responsive to any phase displacement between said parts for changing the speed of operation of said mechanical clock driven means.

References Cited in the file of this patent

UNITED STATES PATENTS

| 997,603 | Cole | July 11, 1911 |
| 1,075,543 | Bryce | Oct. 14, 1913 |
| 1,851,835 | Higgins | Mar. 29, 1932 |
| 1,933,923 | Neureuther | Nov. 7, 1933 |
| 2,031,705 | Graseby | Feb. 25, 1936 |
| 2,397,562 | Potter | Apr. 2, 1946 |
| 2,513,360 | Rahmel | July 4, 1950 |
| 2,660,509 | Rusch | Nov. 24, 1953 |

FOREIGN PATENTS

| 541,079 | Great Britain | Nov. 12, 1941 |

UNITED STATES PATENT OFFICE

CERTIFICATE OF CORRECTION

Patent No. 2,801,896                             August 6, 1957

Fred Krahulec

It is hereby certified that error appears in the printed specification of the above numbered patent requiring correction and that the said Letters Patent should read as corrected below.

Column 14, lines 32 and 33, strike out "in which the record receiving --element --.

Signed and sealed this 17th day of December 1957.

(SEAL)

Attest:
KARL H. AXLINE
Attesting Officer

ROBERT C. WATSON
Commissioner of Patents